(12) United States Patent
Gonze et al.

(10) Patent No.: US 8,252,077 B2
(45) Date of Patent: Aug. 28, 2012

(54) ELECTRICALLY HEATED PARTICULATE FILTER HEATER INSULATION

(75) Inventors: Eugene V. Gonze, Pinckney, MI (US); Michael J. Paratore, Jr., Howell, MI (US); Kevin W. Kirby, Calabasas Hills, CA (US); Amanda Phelps, Malibu, CA (US)

(73) Assignee: GM Global Technology Operations LLC

( * ) Notice: Subject to any disclaimer, the term of this patent is extended or adjusted under 35 U.S.C. 154(b) by 1319 days.

(21) Appl. No.: 11/934,256

(22) Filed: Nov. 2, 2007

(65) Prior Publication Data

US 2011/0259190 A1    Oct. 27, 2011

Related U.S. Application Data

(60) Provisional application No. 60/972,946, filed on Sep. 17, 2007.

(51) Int. Cl.
*B01D 46/00* (2006.01)

(52) U.S. Cl. ...... 55/282.3; 55/283; 55/523; 55/DIG. 30; 55/DIG. 10

(58) Field of Classification Search ............ 55/522–524, 55/282.3; 422/169–172, 177–182
See application file for complete search history.

(56) References Cited

U.S. PATENT DOCUMENTS

| | | | |
|---|---|---|---|
| 4,450,682 A | 5/1984 | Sato et al. | 60/286 |
| 4,505,107 A | 3/1985 | Yamaguchi et al. | |
| 4,505,726 A | 3/1985 | Takeuchi | |
| 4,516,993 A | 5/1985 | Takeuchi | |
| 4,535,589 A | 8/1985 | Yoshida et al. | 60/303 |
| 4,544,388 A * | 10/1985 | Rao et al. | 55/282 |
| 4,558,565 A | 12/1985 | Kojima et al. | 60/286 |
| 4,671,058 A | 6/1987 | Yoshida et al. | 60/303 |
| 4,851,015 A | 7/1989 | Wagner et al. | 95/15 |
| 5,098,455 A * | 3/1992 | Doty et al. | 55/523 |
| 5,203,166 A | 4/1993 | Miller | |
| 5,207,807 A | 5/1993 | Manfre' et al. | |
| 5,259,190 A | 11/1993 | Bagley et al. | |
| 5,277,937 A | 1/1994 | Bagley et al. | 427/553 |
| 5,405,422 A * | 4/1995 | Ueda et al. | 55/282.3 |
| 5,423,904 A | 6/1995 | Dasgupta | 96/146 |
| 5,457,945 A * | 10/1995 | Adiletta | 55/301 |
| 5,559,580 A | 9/1996 | Niizawa et al. | |

(Continued)

FOREIGN PATENT DOCUMENTS

DE    4422198 A1    1/1996

(Continued)

OTHER PUBLICATIONS

U.S. Appl. No. 11/557,715, filed Nov. 8, 2006, Gonze et al.

(Continued)

*Primary Examiner* — Duane Smith
*Assistant Examiner* — Amber Orlando

(57) ABSTRACT

A system includes a particulate matter (PM) filter that includes an upstream end for receiving exhaust gas and a downstream end. A zoned resistive heater is arranged spaced from said upstream end and includes N zones, where N is an integer greater than one, wherein each of the N zones includes M sub-zones, where M is an integer greater than or equal to one, and wherein the zoned heater includes an electrically insulating material. A control module selectively activates at least a selected one of the N zones to initiate regeneration in downstream portions of the PM filter from the one of the N zones and deactivates non-selected ones of the N zones.

22 Claims, 9 Drawing Sheets

U.S. PATENT DOCUMENTS

| | | | | |
|---|---|---|---|---|
| 5,571,298 A | * | 11/1996 | Buck | 55/282.3 |
| 5,595,580 A | | 1/1997 | Kawamura | 55/288 |
| 5,780,811 A | | 7/1998 | Kawamura | 219/205 |
| 5,938,802 A | * | 8/1999 | Saito et al. | 55/282.3 |
| 6,120,583 A | | 9/2000 | Saito et al. | 95/278 |
| 6,176,896 B1 | * | 1/2001 | Dementhon et al. | 95/14 |
| 6,432,168 B2 | * | 8/2002 | Schonauer | 95/18 |
| 6,660,068 B1 | | 12/2003 | Garner et al. | 95/283 |
| 6,736,870 B2 | | 5/2004 | Best et al. | 55/282.3 |
| 7,326,264 B2 | * | 2/2008 | Hammer | 55/282.3 |
| 7,469,532 B2 | | 12/2008 | Williamson | |
| 7,686,857 B2 | | 3/2010 | Gonze et al. | |
| 2005/0081494 A1 | * | 4/2005 | Iyer et al. | 55/282.3 |
| 2005/0232827 A1 | | 10/2005 | Merry | 422/179 |
| 2005/0252177 A1 | * | 11/2005 | Ishikawa | 55/282.3 |
| 2007/0062181 A1 | | 3/2007 | Williamson et al. | 60/297 |

FOREIGN PATENT DOCUMENTS

JP  3168314 A  7/1991

OTHER PUBLICATIONS

U.S. Appl. No. 11/561,110, filed Nov. 17, 2006, Gonze et al.
U.S. Appl. No. 11/956,722, filed Dec. 14, 2007, Gonze.

* cited by examiner

ELECTRICALLY HEATED PARTICULATE FILTER HEATER INSULATION

CROSS-REFERENCE TO RELATED APPLICATIONS

This application claims the benefit of U.S. Provisional Patent Application No. 60/972,946, filed on Sep. 17, 2007.

This application is related to U.S. Provisional Patent Application No. 60/955,743 filed on Aug. 14, 2007 and U.S. patent application Nos. 11/561,100 filed on Nov. 17, 2006, 11/561,108 filed on Nov. 17, 2006 and 11/557,715 filed on Nov. 8, 2006. The disclosures of the above applications are incorporated herein by reference in their entirety.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to electrically heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

SUMMARY

A system includes a particulate matter (PM) filter that includes an upstream end for receiving exhaust gas and a downstream end. A zoned resistive heater is arranged spaced from said upstream end and includes N zones, where N is an integer greater than one, wherein each of the N zones includes M sub-zones, where M is an integer greater than or equal to one, and wherein the heater includes an electrically insulating material. A control module selectively activates at least a selected one of the N zones to initiate regeneration in downstream portions of the PM filter from the one of the N zones and deactivates non-selected ones of the N zones.

A method includes providing a particulate matter (PM) filter including an upstream end for receiving exhaust gas and a downstream end, arranging a zoned resistive heater spaced from the upstream end that includes N zones, where N is an integer greater than one, wherein each of the N zones comprises M sub-zones, where M is an integer greater than or equal to one, and wherein the heater includes an electrically insulating material, and selectively activating at least a selected one of the N zones to initiate regeneration in downstream portions of the PM filter from the one of the N zones and deactivates non-selected ones of the N zones.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
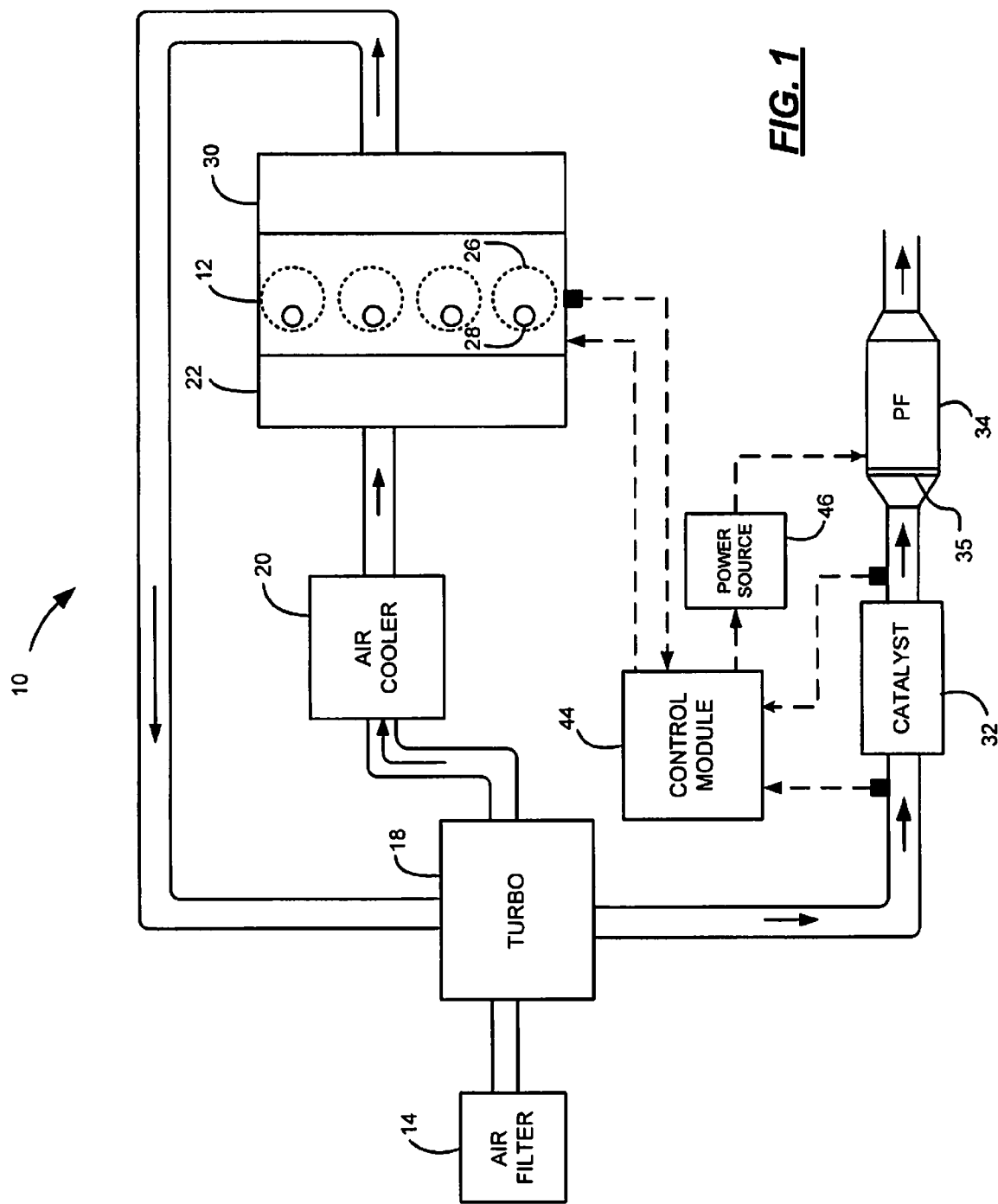
FIG. 1 is a functional block diagram of an exemplary engine including a particulate matter (PM) filter with a zoned inlet heater that is spaced from the PM filter.

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure utilizes a heater with zones. The electrical heater is spaced from the PM filter. In other words, the electric heater is located in front of the PM filter but is not in contact with the downstream PM filter. The heater selectively heats portions of the PM filter. The PM heater may be mounted close enough to the front of the PM filter to control the heating pattern. The length of the heater is set to optimize the exhaust gas temperature.

Thermal energy is transmitted from the heater to the PM filter by the exhaust gas. Therefore the PM filter is predominantly heated by convection. The electrical heater is divided into zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter is regenerated by selectively heating one or more of the zones in the front of the PM filter and igniting the soot using the heated exhaust gas. When a sufficient face temperature is reached, the heater is turned off and the burning soot then cascades down the length of the PM filter channel, which is similar to a burning fuse on a firework. In other words, the heater may be activated only long enough to start the soot ignition and is then shut off. Other regeneration systems typically use both conduction and convection and maintain power to the heater (at lower temperatures such as 600 degrees Celsius) throughout the soot burning process. As a result, these systems tend to use more power than the system proposed in the present disclosure.

The burning soot is the fuel that continues the regeneration. This process is continued for each heating zone until the PM filter is completely regenerated.

The heater zones are spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

A largest temperature gradient occurs at edges of the heaters. Therefore, activating one heater past the localized stress zone of another heater enables more actively heated regeneration volume without an increase in overall stress. This tends to improve the regeneration opportunity within a drive cycle and reduces cost and complexity since the system does not need to regenerate as many zones independently.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PM filter) assembly 34 with a zoned inlet heater 35. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the zoned heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The zoned inlet heater 35 is spaced from the PM filter assembly 34 and heats the exhaust to a regeneration temperature as will be described below.

A control module 44 controls the engine and PM filter regeneration based on various sensed information. More specifically, the control module 44 estimates loading of the PM filter assembly 34. When the estimated loading is at a predetermined level and the exhaust flow rate is within a desired range, current is controlled to the PM filter assembly 34 via a power source 46 to initiate the regeneration process. The duration of the regeneration process may be varied based upon the estimated amount of particulate matter within the PM filter assembly 34.

Current is applied to the zoned heater 35 during the regeneration process. More specifically, the energy heats selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection. The remainder of the regeneration process is achieved using the heat generated by the heated exhaust passing through the PM filter.

Figure 2:
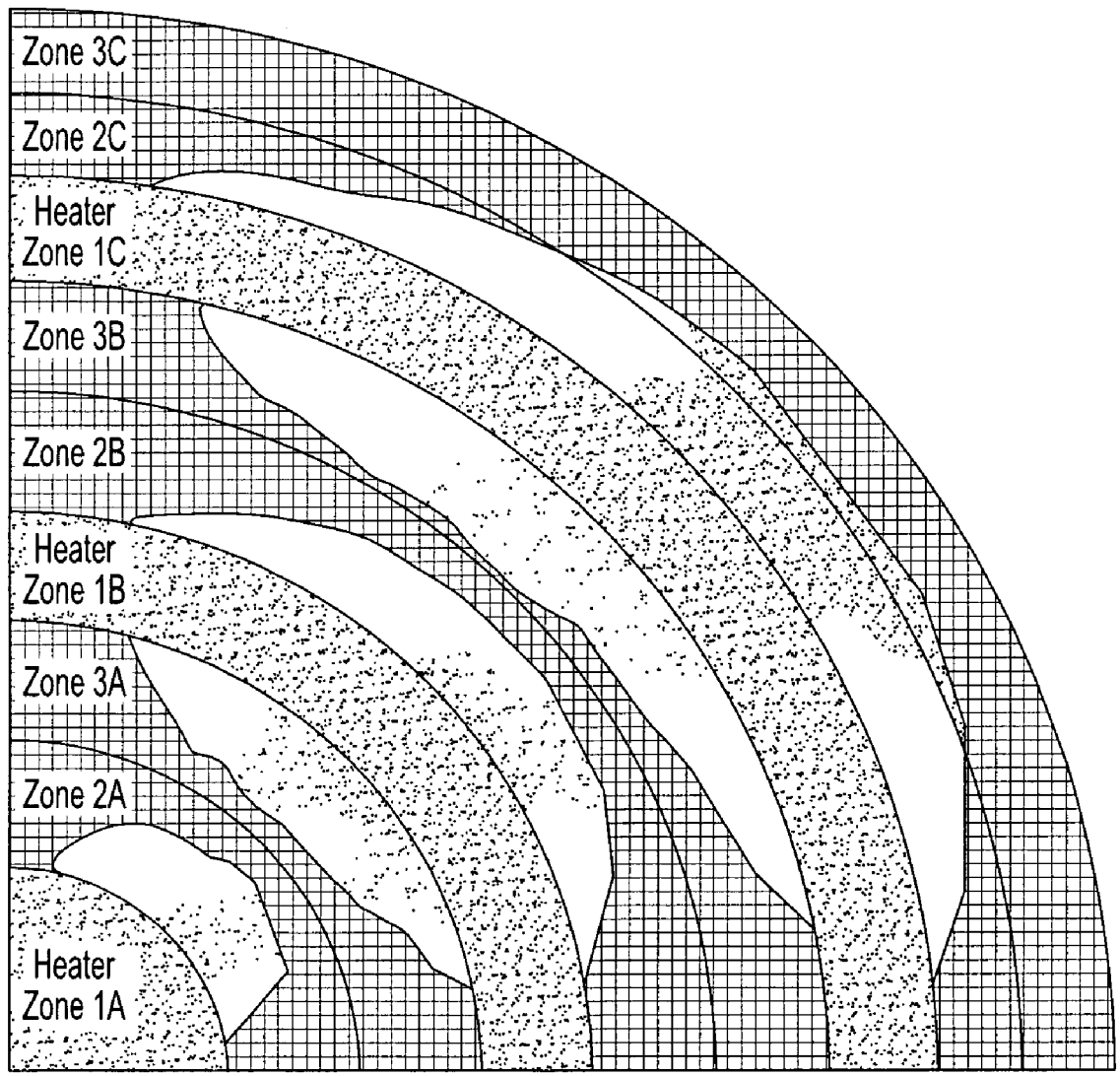
FIG. 2 illustrates exemplary zoning of the zoned inlet heater of the electrically heated particulate matter (PM) filter of FIG. 1 in further detail.

Referring now to FIG. 2, an exemplary zoned inlet heater 35 for the PM filter assembly 34 is shown in further detail. The zoned inlet heater 35 is arranged spaced from the PM filter assembly 34. The PM filter assembly 34 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PM filter that are not downstream from an activated zone act as stress mitigation zones. For example in FIG. 2, sub-zones 1A, 1B and 10 are activated and sub-zones 2A, 2B, 2C, 3A, 3B, and 3C act as stress mitigation zones.

The corresponding portions of the PM filter downstream from the active heater sub-zones 1A, 1B and 10 thermally expand and contract during heating and cooling. The stress mitigation sub-zones 2A and 3A, 2B and 3B, and 2C and 3C mitigate stress caused by the expansion and contraction of the heater sub-zones 1A, 1B and 10. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 3B:
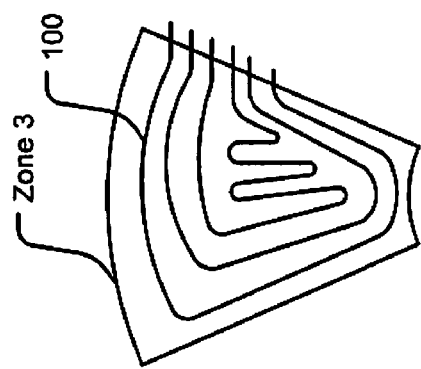
FIG. 3B illustrates an exemplary resistive heater in one of the zones of the zoned inlet heater of FIG. 3A.
Figure 3A:
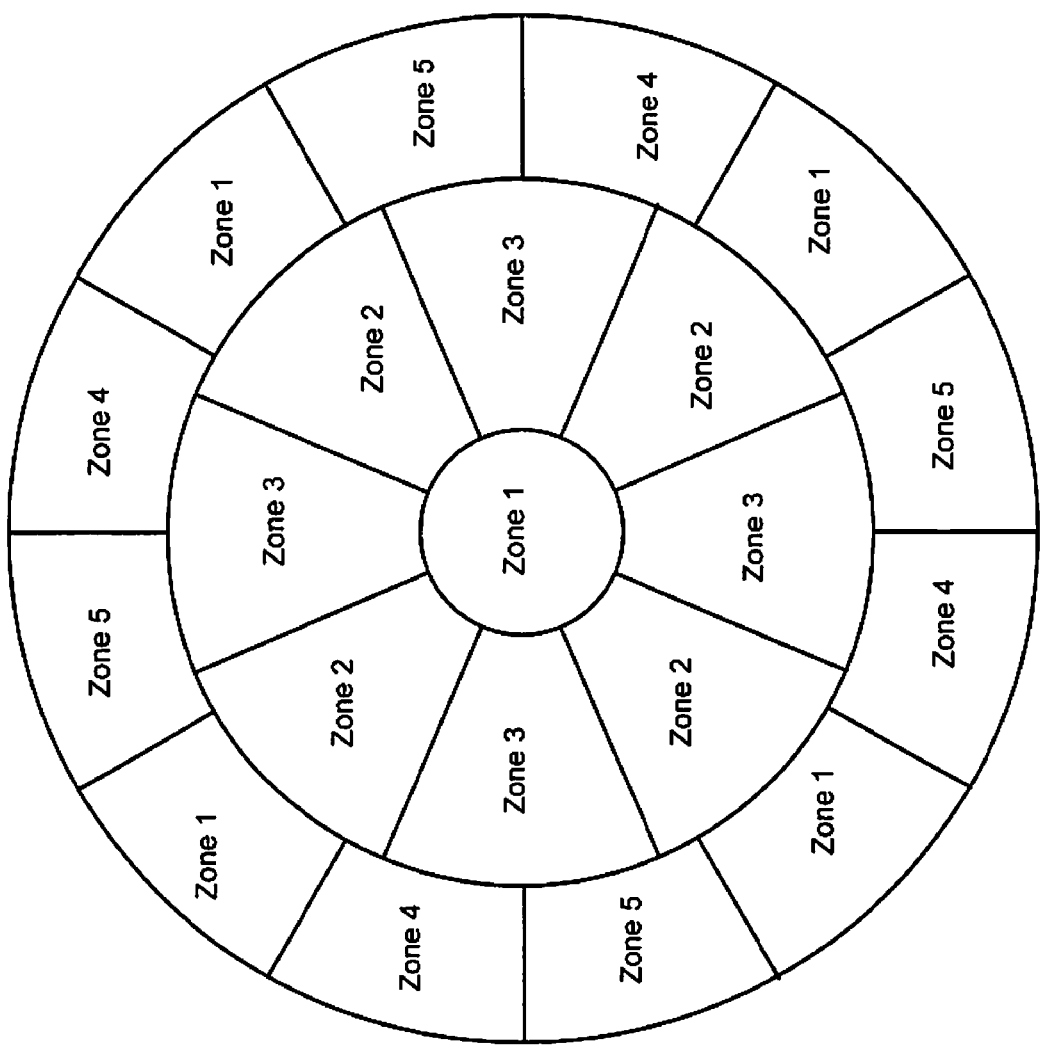
FIG. 3A illustrates a second exemplary zoning of the zoned inlet heater of the electrically heated PM filter of FIG. 1 in further detail.

Referring now to FIG. 3A, another exemplary zoned inlet heater arrangement is shown. A center portion may be surrounded by a middle portion including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Referring now to FIG. 3B, an exemplary resistive heater 100 arranged adjacent to one of the zones (e.g. zone 3) from the first circumferential band of zones in FIG. 3A is shown. The resistive heater 100 may comprise one or more coils that cover the respective zone to provide sufficient heating.

Figure 4B:
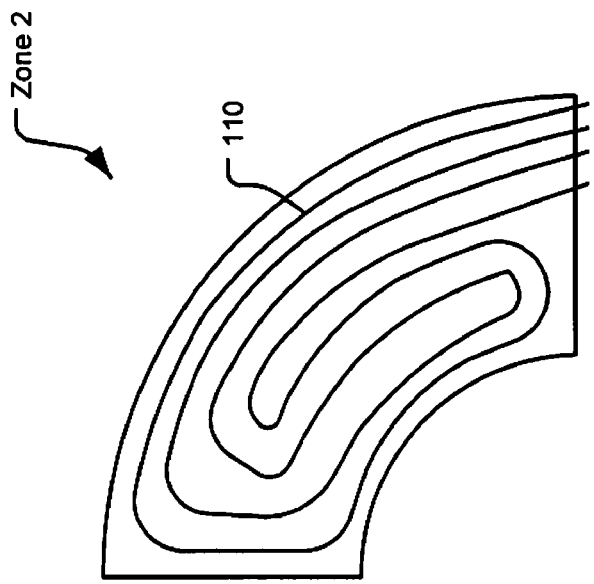
FIG. 4B illustrates an exemplary resistive heater in one of the zones of the zoned inlet heater of FIG. 4A.
Figure 4A:
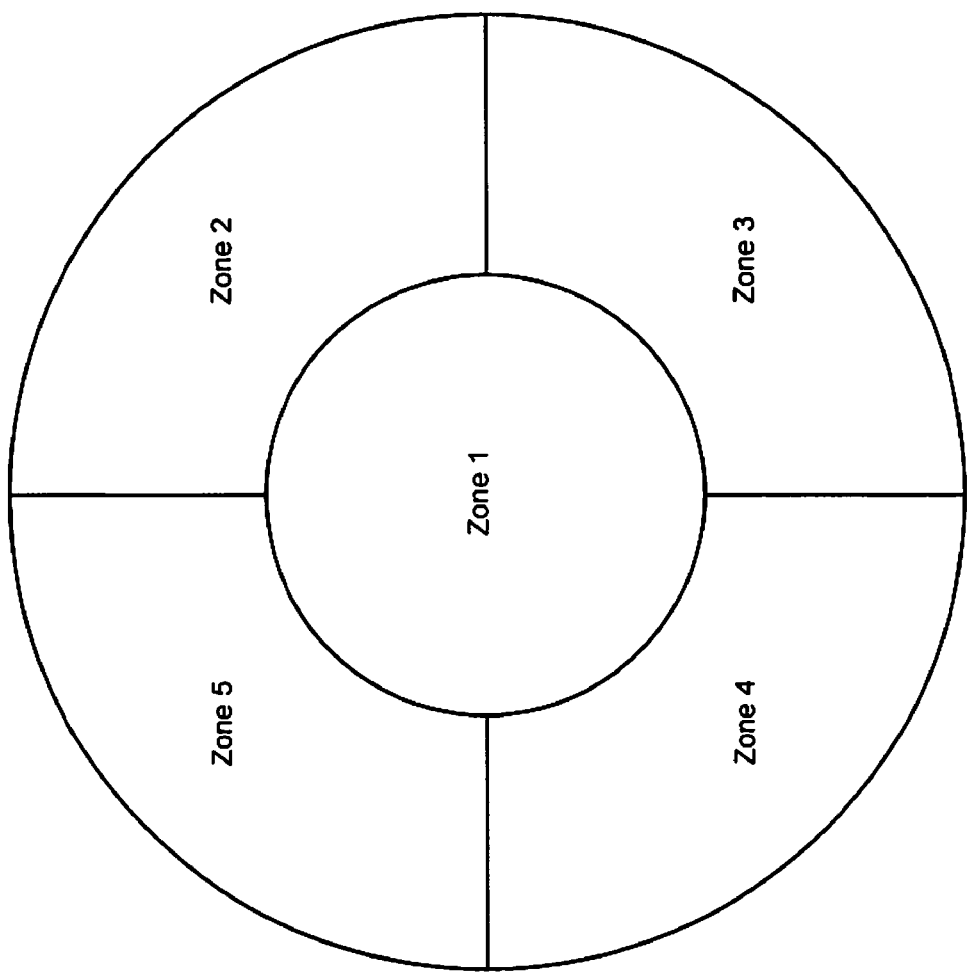
FIG. 4A illustrates a second exemplary zoning of the zoned inlet heater of the electrically heated PM filter of FIG. 1 in further detail.

Referring now to FIG. 4A, another exemplary zoned inlet heater arrangement is shown. A center portion may be surrounded by an outer portion including a circumferential band of zones. In this example, the center portion includes zone 1. The circumferential band of zones includes zones 2, 3, 4, and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated. In other implementations, multiple zones may be activated at the same time. For example, complementary zones (e.g. zones 2 and 4 or zones 3 and 5) may be activated at the same time.

Referring now to FIG. 4B, an exemplary resistive heater 110 arranged adjacent to one of the zones (e.g. zone 2) from the first circumferential band of zones in FIG. 4A is shown. The resistive heater 110 may comprise one or more coils that cover the respective zone to provide sufficient heating.

Figure 5:
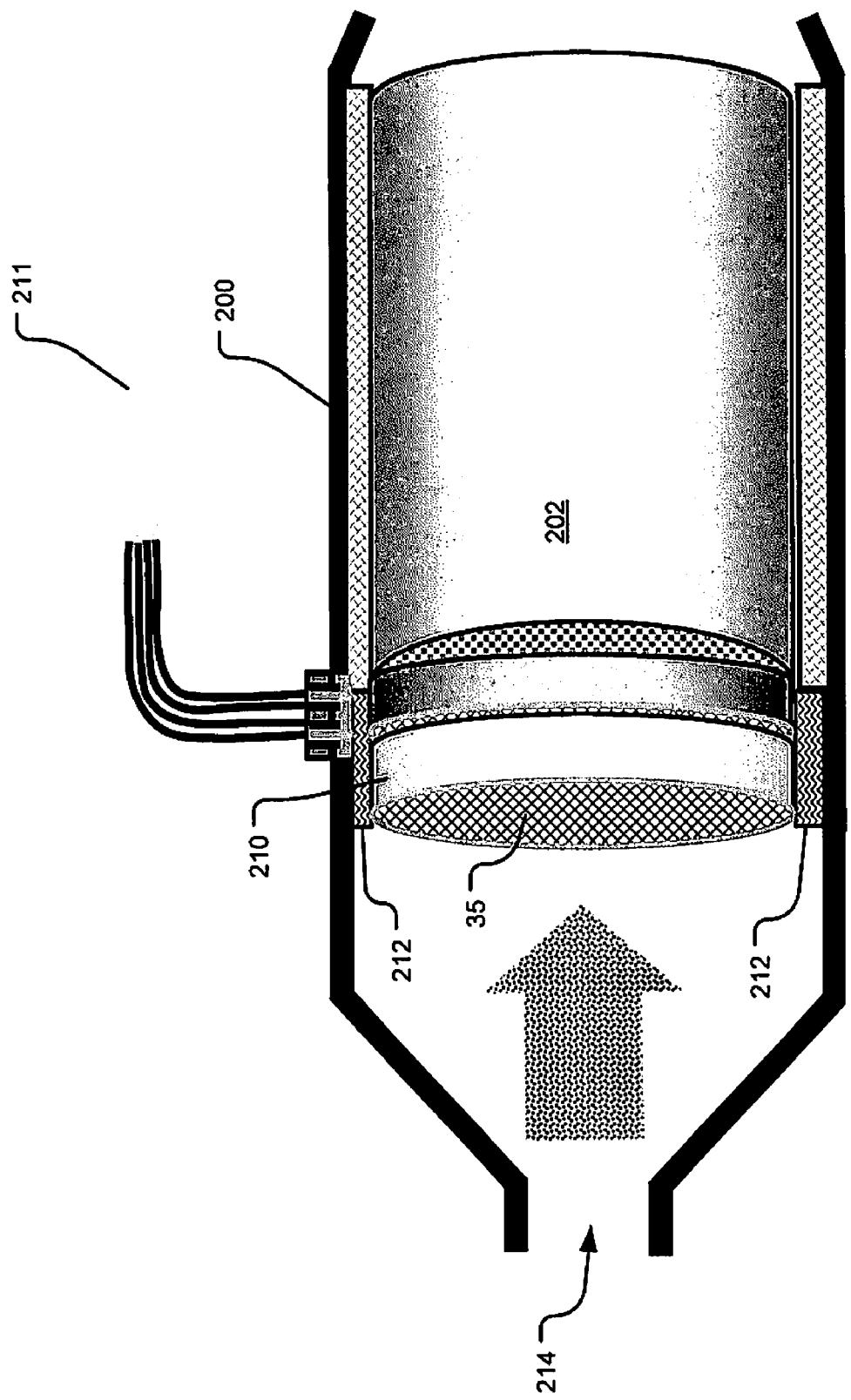
FIG. 5 illustrates the electrically heated PM filter having a zoned electric heater that is spaced from the PM filter.

Referring now to FIG. 5, the PM filter assembly 34 is shown in further detail. The PM filter assembly 34 includes a housing 200, a filter 202, and the zoned heater 35. The heater 35 may be arranged between a laminar flow element 210 and a substrate of the filter 202. An electrical connector 211 may provide current to the zones of the PM filter assembly 34 as described above.

As can be appreciated, the heater 35 may be spaced from the filter 202 such that the heating is predominantly convection heating. Insulation 212 may be arranged between the heater 35 and the housing 200. Exhaust gas enters the PM filter assembly 34 from an upstream inlet 214 and is heated by one or more zones of the PM filter assembly 34. The heated exhaust gas travels a distance and is received by the filter 202. The heater 35 may be spaced from and not in contact with the filter 202.

Figure 6:
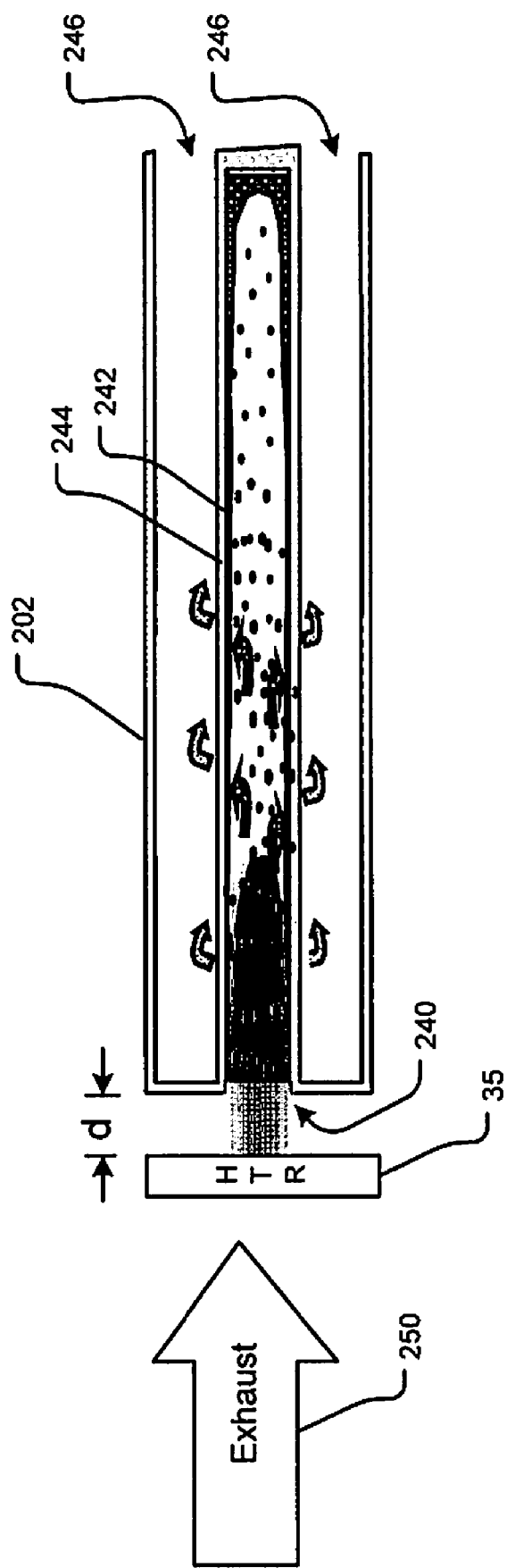
FIG. 6 illustrates heating within the zoned electric heater.

Referring now to FIG. 6, heating within the PM filter assembly 34 is shown in further detail. Exhaust gas 250 passes through the heater 35 and is heated by one or more zones of the heater 35. The heated exhaust gas travels a distance "d" and is then received by the filter 202. The distance "d" may be ½" or less. The filter 202 may have a central inlet 240, a channel 242, filter material 244 and an outlet 246 located radially outside of the inlet. The filter may be catalyzed. The heated exhaust gas causes PM in the filter to burn, which regenerates the PM filter. The heater 35 transfers heat by convection to ignite a front portion of the filter 202. When the soot in the front face portions reaches a sufficiently high temperature, the heater is turned off. Combustion of soot then cascades down a filter channel 254 without requiring power to be maintained to the heater.

Figure 7:
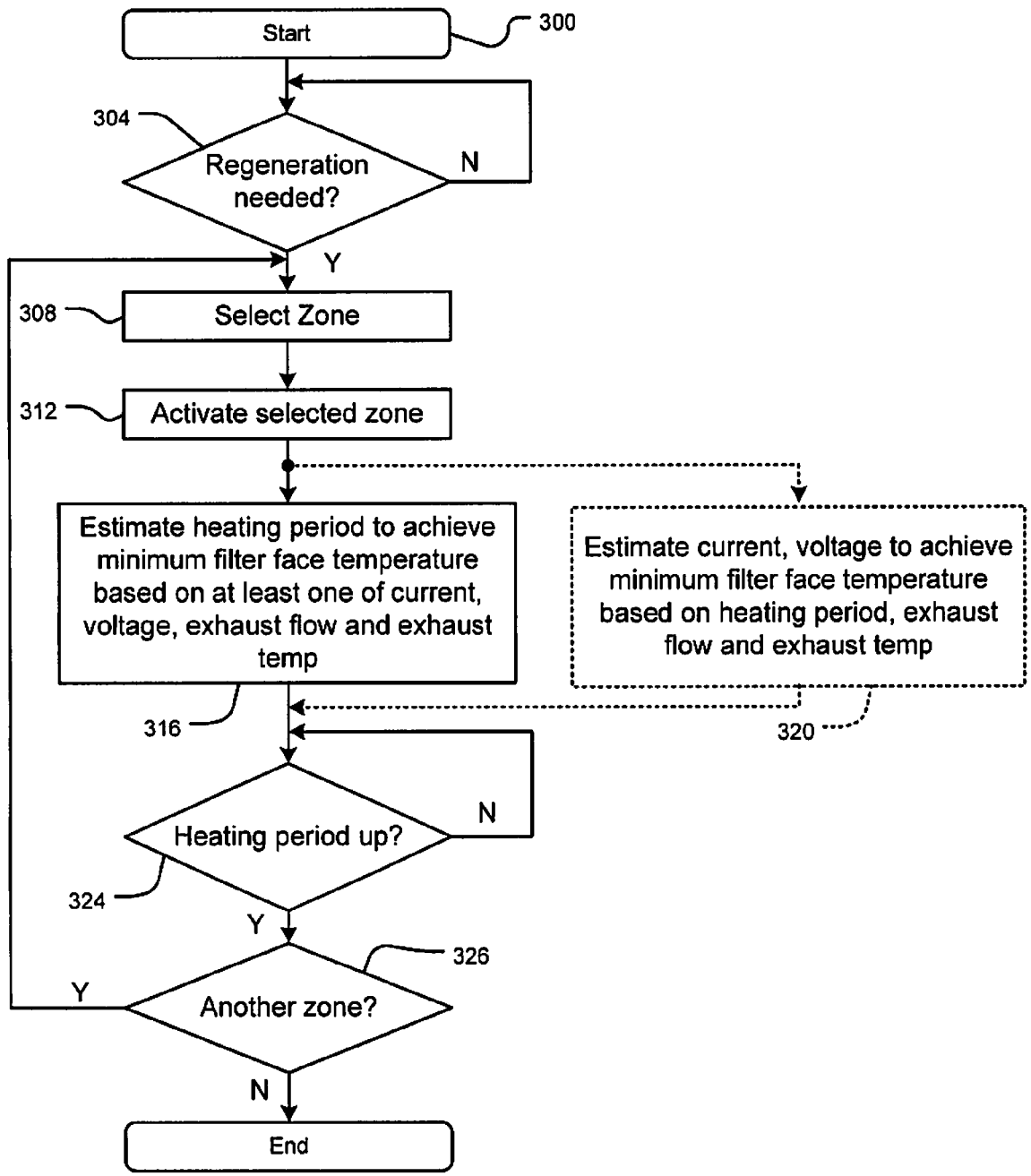
FIG. 7 is a flowchart illustrating steps performed by the control module to regenerate the PM filter.

Referring now to FIG. 7, steps for regenerating the PM filter are shown. In step 300, control begins and proceeds to step 304. If control determines that regeneration is needed in step 304, control selects one or more zones in step 308 and activates the heater for the selected zone in step 312. In step 316, control estimates a heating period sufficient to achieve a minimum filter face temperature based on at least one of current, voltage, exhaust flow and exhaust temperature. The minimum face temperature should be sufficient to start the soot burning and to create a cascade effect. For example only, the minimum face temperature may be set to 700 degrees Celsius or greater. In an alternate step 320 to step 316, control estimates current and voltage needed to achieve minimum filter face temperature based on a predetermined heating period, exhaust flow and exhaust temperature.

In step 324, control determines whether the heating period is up. If step 324 is true, control determines whether additional zones need to be regenerated in step 326. If step 326 is true, control returns to step 308. Otherwise control ends.

In use, the control module determines when the PM filter requires regeneration. Alternately, regeneration can be performed periodically or on an event basis. The control module may estimate when the entire PM filter needs regeneration or when zones within the PM filter need regeneration. When the control module determines that the entire PM filter needs regeneration, the control module sequentially activates one or more of the zones at a time to initiate regeneration within the associated downstream portion of the PM filter. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

Figure 8:
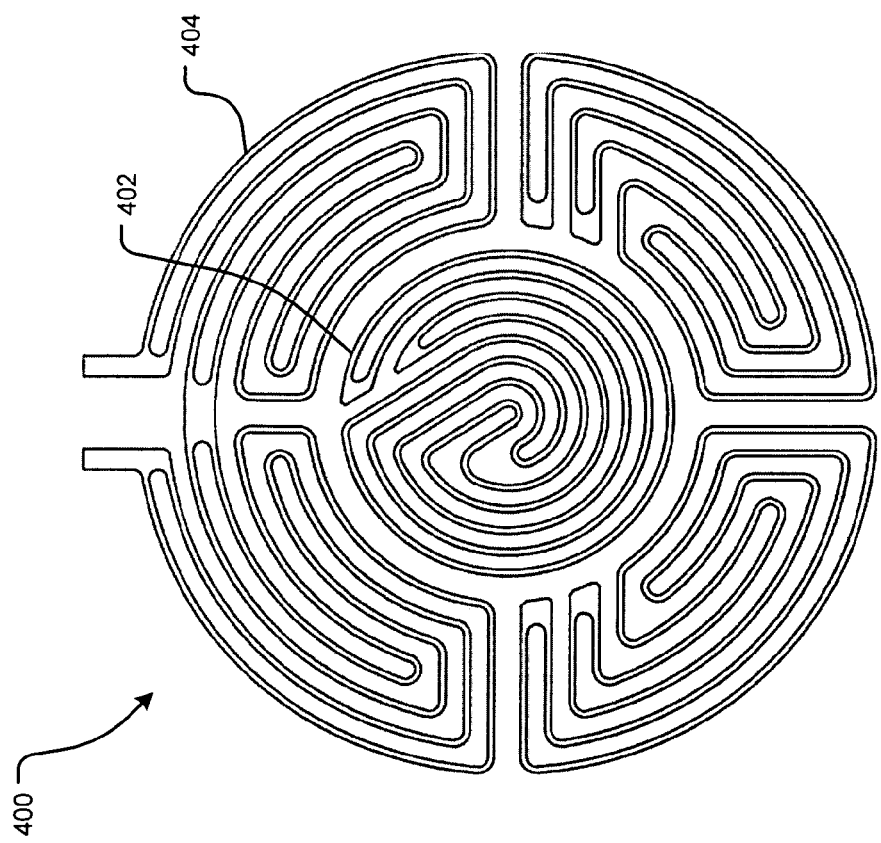
FIG. 8 illustrates a zoned resistive heater grid.

Referring now to FIG. 8, a zoned resistive heater grid 400 that corresponds to the zoned inlet heat arrangement of FIG. 4A is shown. The heater grid 400 includes a center portion 402 corresponding to zone 1 and an outer portion 404 corresponding to zones 2, 3, 4, and 5. Zones of the heater grid 400 may be selectively activated and deactivated as described above with respect to FIGS. 1-7.

Resistive coils in individual zones of the heater grid 400 may expand while activated (i.e. due to thermal expansion). Consequently, a selected (activated) zone may expand and come into contact with adjacent non-selected (deactivated) zones. For example, a portion of the heater grid 400 corresponding to zone 2 may expand and come into contact with one or more of zones 1, 4, and 5. When an activated zone contacts an adjacent deactivated zone, the current applied to the activated zone flows into the adjacent deactivated zone. In other words, the activated zone is short circuited. When the activated zone is short circuited, the corresponding zone of the filter does not reach the desired minimum filter face temperature and proper filter regeneration is prevented.

Figure 9:
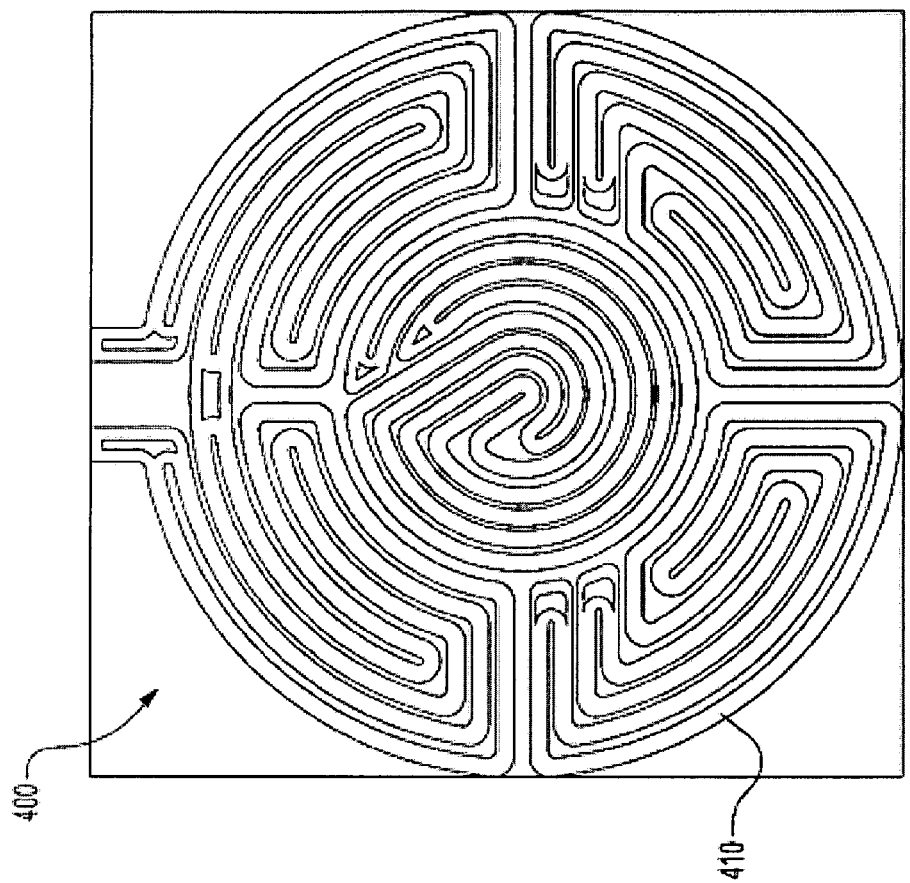
FIG. 9 illustrates a zoned resistive heater grid that include an insulating material.

Referring now to FIG. 9, resistive coils of the zoned resistive heater grid 400 are coated with an insulating material 410. The insulating material 410 prevents the resistive coils of a selected zone from contacting adjacent zones. In other words, even when the resistive coils experience thermal expansion, the insulating material 410 prevents short circuiting in the selected zone. The insulating material 410 is thermally conductive to allow the heat from the heater grid 400 to heat the exhaust gas. Conversely, the insulating material 410 is not electrically conductive. As such, current flowing through the resistive coil of a selected zone is prevented from flowing into an adjacent zone. Further, the insulating material 410 may be selected to thermally expand at a rate consistent with thermal expansion of the heater grid 400. For example only, the insulating material 410 may include aluminum oxide.

Figure 10:
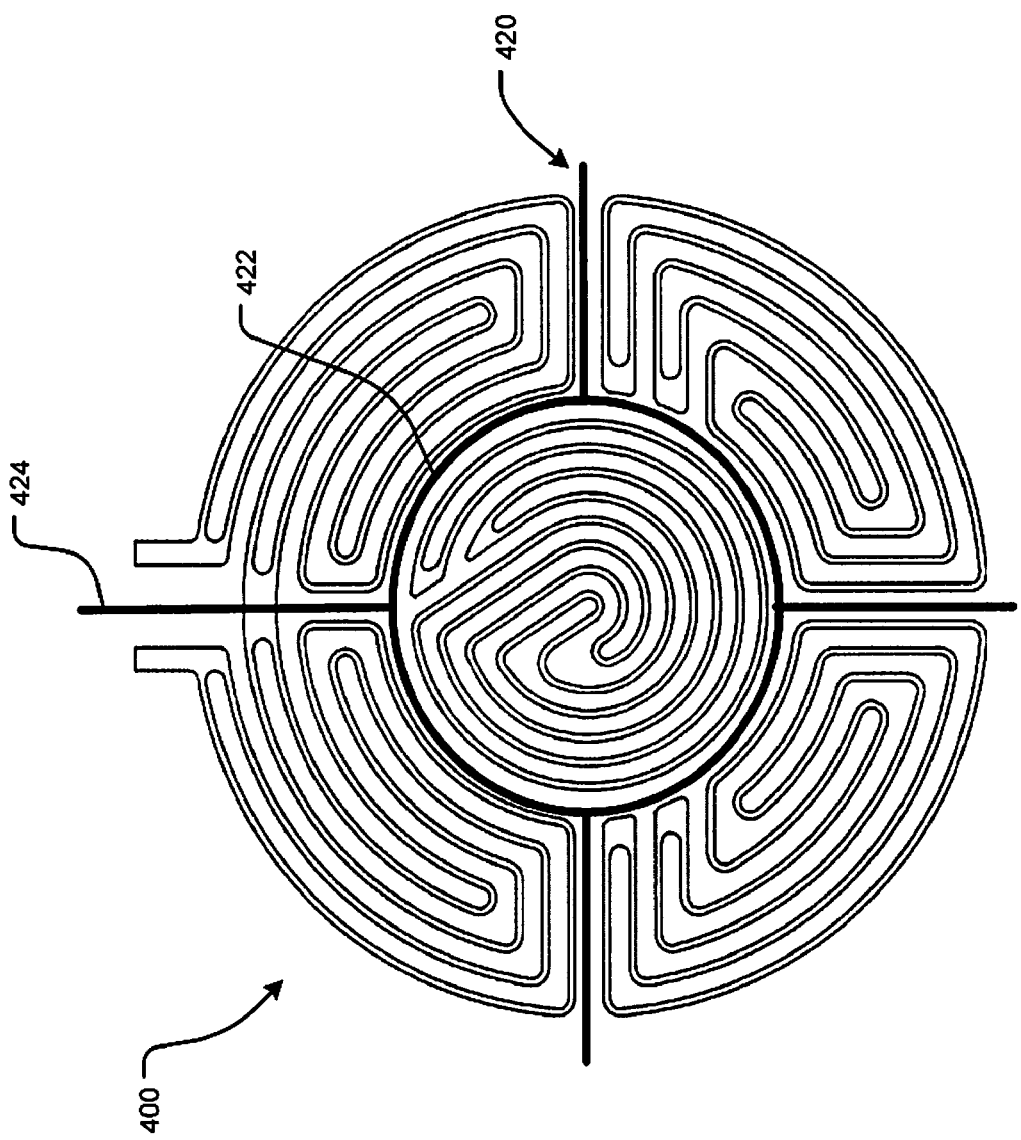
FIG. 10 illustrates a zoned resistive heater grid that includes an insulating buffer.

Referring now to FIG. 10, the zoned resistive heater grid 400 includes an insulating buffer 420. The insulating buffer 420 is located between each of the zones of the heater grid 400. For example, the insulating buffer 420 may include a center portion 422 that surrounds zone 1 of the heater grid 400 and a plurality of spokes 424 that extend outward from the center portion 422. Each of the plurality of spokes extends between adjacent ones of the zones in the outer portion of the heater grid 400.

As described above with respect to FIG. 9, the insulating buffer 420 is thermally conductive but is not electrically conductive. As such, current flowing through the resistive coil of a selected zone is prevented from flowing into an adjacent zone and short circuiting is avoided. For example only, the insulating buffer 420 may include aluminum oxide.

In another implementation, the control module 44 (as shown in FIG. 1) may detect short circuits due to thermal expansion. For example, the control module 44 may detect short circuits when the zoned resistive heater grid 400 does not include one of the insulating material 410 and the insulating buffer 420 and/or when one of the insulating material 410 and the insulating buffer 420 is damaged. For example, the control module 44 may measure a voltage across at least a portion of non-selected (deactivated) zones of the heater grid 400. When a voltage is detected (e.g. when the voltage across one or more of the deactivated zones is greater than a threshold), the control module 44 determines that the activated zone is in contact with an adjacent one of the deactivated zones and, thus, is short circuited. Consequently, the control module 44 may deactivate the activated zone and activate a non adjacent zone. For example, when a short circuit is detected when zone 2 is activated, the control module 44 may deactivate zone 2 and activate zone 3. Further, the control module 44 may indicate a fault that indicates that one of the heater grid 400, the insulating material 410, and the insulating buffer 420 needs to be replaced.

The present disclosure may substantially reduce the fuel economy penalty, decrease tailpipe temperatures, and improve system robustness due to the smaller regeneration time.

What is claimed is:

1. A system comprising:
 a particulate matter (PM) filter that includes an upstream end for receiving exhaust gas and a downstream end;
 a zoned resistive heater that is arranged spaced from said upstream end and that comprises N zones, where N is an integer greater than one, wherein each of said N zones comprises M sub-zones, where M is an integer greater than or equal to one, and wherein said heater includes an electrically insulating material; and
 a control module that is configured to selectively activate at least a selected one of said N zones to initiate regeneration in downstream portions of said PM filter from said one of said N zones, that is configured to deactivate non-selected ones of said N zones, and that is configured to determine whether said selected one of said N zones is in contact with one of said non-selected ones of said N zones.

2. The system of claim 1 wherein each of said N zones of said heater includes a resistive coil that is coated with said insulating material.

3. The system of claim 1 wherein said insulating material is arranged between adjacent ones of said N zones.

4. The system of claim 3 wherein said insulating material includes a center portion that surrounds a center one of said N zones and a plurality of spokes that extend outward from said center one of said N zones and that extend between said adjacent ones of said N zones.

5. The system of claim 1 wherein said insulating material includes aluminum oxide.

6. The system of claim 1 wherein said control module performs said determining based on a voltage across said one of said non-selected ones of said N zones.

7. The system of claim 1 wherein said control module deactivates said selected one of said N zones and activates one of said non-selected ones of said N zones that is not adjacent to said selected one of said N zones when said selected one of said N zones is in contact with one of said non-selected ones of said N zones.

8. The system of claim 1 wherein said non-selected ones of said N zones provide stress mitigation zones.

9. The system of claim 1 wherein said control module estimates a heating period to heat a face portion of said PM filter a temperature greater than or equal to a predetermined temperature and shuts down said heater after said heating period.

10. The system of claim 9 wherein said predetermined temperature is 700 degrees Celsius.

11. The system of claim 1 wherein said heater is spaced a distance less than or equal to ½ inch.

12. A method comprising:
 providing a particulate matter (PM) filter that includes an upstream end for receiving exhaust gas and a downstream end;
 arranging a zoned resistive heater spaced from said upstream end that comprises N zones, where N is an integer greater than one, wherein each of said N zones comprises M sub-zones, where M is an integer greater than or equal to one, and wherein said heater includes an electrically insulating material;
 selectively activating at least a selected one of said N zones to initiate regeneration in downstream portions of said PM filter from said one of said N zones and deactivates non-selected ones of said N zones; and
 determining whether said selected one of said N zones is in contact with one of said non-selected ones of said N zones.

13. The method of claim 12 wherein each of said N zones of said heater includes a resistive coil that is coated with said insulating material.

14. The method of claim 12 wherein said insulating material is arranged between adjacent ones of said N zones.

15. The method of claim 14 wherein said insulating material includes a center portion that surrounds a center one of said N zones and a plurality of spokes that extend outward from said center one of said N zones and that extend between said adjacent ones of said N zones.

16. The method of claim 12 wherein said insulating material includes aluminum oxide.

17. The method of claim 12 wherein said determining is performed based on a voltage across said one of said non-selected ones of said N zones.

18. The method of claim 12 further comprising:

when said selected one of said N zones is in contact with one of said non-selected ones of said N zones, deactivating said selected one of said N zones; and activating one of said non-selected ones of said N zones that is not adjacent to said selected one of said N zones when said selected one of said N zones is in contact with one of said non-selected ones of said N zones.

19. The method of claim 12 wherein said non-selected ones of said N zones provide stress mitigation zones.

20. The method of claim 12 further comprising estimating a heating period to heat a face portion of said PM filter a temperature greater than or equal to a predetermined temperature and shutting down said heater after said heating period.

21. The method of claim 20 wherein said predetermined temperature is 700 degrees Celsius.

22. The method of claim 12 wherein said heater is spaced a distance less than or equal ½.

* * * * *